United States Patent
Li et al.

(10) Patent No.: US 7,830,977 B2
(45) Date of Patent: Nov. 9, 2010

(54) PROVIDING CQI FEEDBACK WITH COMMON CODE RATE TO A TRANSMITTER STATION

(75) Inventors: Qinghua Li, Sunnyvale, CA (US); Guangjie Li, Beijing (CN); Xintian E. Lin, Mountain View, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 11/617,586

(22) Filed: Dec. 28, 2006

(65) Prior Publication Data

US 2007/0254603 A1 Nov. 1, 2007

Related U.S. Application Data

(60) Provisional application No. 60/797,014, filed on May 1, 2006.

(51) Int. Cl.
*H04B 7/02* (2006.01)
*H04B 1/00* (2006.01)

(52) U.S. Cl. .......................... 375/267; 455/88

(58) Field of Classification Search ............. 375/260, 375/267, 285, 295, 316, 346–350, 358; 455/103, 455/115.1, 115.3, 24, 69, 88
See application file for complete search history.

(56) References Cited

U.S. PATENT DOCUMENTS 6,473,467 B1 10/2002 Wallace et al.

(Continued)

FOREIGN PATENT DOCUMENTS

EP 1434365 A2 6/2004

OTHER PUBLICATIONS

Qinghua Li, Xintian Lin, Guangjie Li, Shanshan Zheng, Minnie Ho, "Scaleable Precoding and Implementation Complexities," 3GPP Long Term Evolution (LTE) meeting, May 8-12, 2006, Shanghai, China.

(Continued)

*Primary Examiner*—Khanh C Tran
(74) *Attorney, Agent, or Firm*—Schwabe, Williamson & Wyatt, P.C.

(57) ABSTRACT

Methods and apparatuses for providing CQI feedback with common code rate to a transmitter station are described herein. In one implementation, the methods may include a receiver station that is communicatively linked to a transmitter station via k spatial channels transmitting a first CQI to the transmitter station that indicates a modulation level for use by the transmitter station to transmit (i.e., to configure for transmission) a first of k streams of signals to be transmitted to the receiver station. The first CQI may further include a common code rate to be used by the transmitter station for transmitting the first of the k streams of signals as well as for transmitting the rest of the k−1 additional streams of signals to the receiver station. The receiver station may further transmit to the transmitter station k−1 additional CQIs to indicate to the transmitter station the k−1 modulation levels to be used by the transmitter station for transmitting the k−1 additional streams of signals to the receiver station.

21 Claims, 11 Drawing Sheets

U.S. PATENT DOCUMENTS

| | | | |
|---|---|---|---|
| 7,072,413 B2 * | 7/2006 | Walton et al. | 375/267 |
| 7,123,887 B2 * | 10/2006 | Kim et al. | 455/103 |
| 2003/0003880 A1 | 1/2003 | Ling et al. | |
| 2003/0035491 A1 | 2/2003 | Walton et al. | |
| 2006/0285605 A1 * | 12/2006 | Walton et al. | 375/267 |
| 2008/0056181 A1 * | 3/2008 | Imamura et al. | 370/329 |

OTHER PUBLICATIONS

Qinghua Li, Guangjie Li, Shanshan Zheng, Xintian Lin, Minnie Ho, "Comparison between Single and Multiple Codewords for Precoded MIMO," 3GPP 3GPP Long Term Evolution (LTE) meeting, May 8-12, 2006, Shanghai, China.

* cited by examiner

PROVIDING CQI FEEDBACK WITH COMMON CODE RATE TO A TRANSMITTER STATION

CROSS REFERENCE TO RELATED APPLICATIONS

The present application claims priority to U.S. Provisional Patent Application No. 60/797,014, filed May 1, 2006, entitled "METHODS AND APPARATUS FOR PROVIDING A CHANNEL QUALITY INDICTOR FEEDBACK SYSTEM FOR SINGLE CODEWORD MODE ASSOCIATED WITH A MULTIPLE-INPUT-MULTIPLE-OUTPUT SYSTEM." The present application claims priority to the 60/797,014 provisional patent application.

TECHNICAL FIELD

Embodiments of the present invention relate to the field of wireless communication systems, more specifically, to methods and apparatuses for providing channel quality indicator (CQI) feedback for closed loop multiple-input multiple-output (MIMO) systems.

BACKGROUND

As wireless communication becomes more and more popular at offices, homes, schools, etc., different wireless technologies and applications may work in tandem to meet the demand for computing and communications at anytime and/or anywhere. For example, a variety of wireless communication networks may coexist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide the broadest range as such networks are widely deployed in cellular infrastructure. Although each of the above-mentioned wireless communication networks may support different usages, coexistence among these networks may provide a more robust environment with anytime and anywhere connectivity.

Some wireless networks, such as WMAN, may employ a communication technique known as multiple-input multiple-output (MIMO). In MIMO, a network node such as a base station or a subscriber station may communicate with another node using multiple antennas. The multiple antennas may be used to communicate with the other node using multiple spatial channels. There are at least two types of MIMO systems, an open loop MIMO system and a closed loop MIMO system. In an open loop system, the transmitting node may transmit data signals to the receiving node without first receiving feedback information from the receiving node to facilitate such communication. In contrast, in a closed loop system, the transmitting node may receive from the receiving node feedback information prior to transmitting data signals to the receiving node. Such feedback information may better facilitate the transmission of the data signals to the receiving node.

The feedback information provided back to the transmitting node may include channel quality indicators (CQIs). Typically, one CQI is provided for one spatial channel. A CQI may specify a modulation coding scheme (MCS) that may further indicate two parameters, a modulation level and a forward error correction (FEC) code rate (herein "code rate"), which the transmitting node may use in order to transmit a spatial stream of signals (herein "stream of signals") via the corresponding spatial channel. Note that in other instances, a CQI may specify other types of channel quality indicator such as a signal-to-interference plus noise ratio (SINR), a signal-to-noise ratio (SNR), and so forth, of the spatial channel associated with the CQI. Unfortunately, feedback such as CQIs may consume large amounts of the feedback bandwidth, thus reducing the overall performance of the wireless network.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

Figure 1:
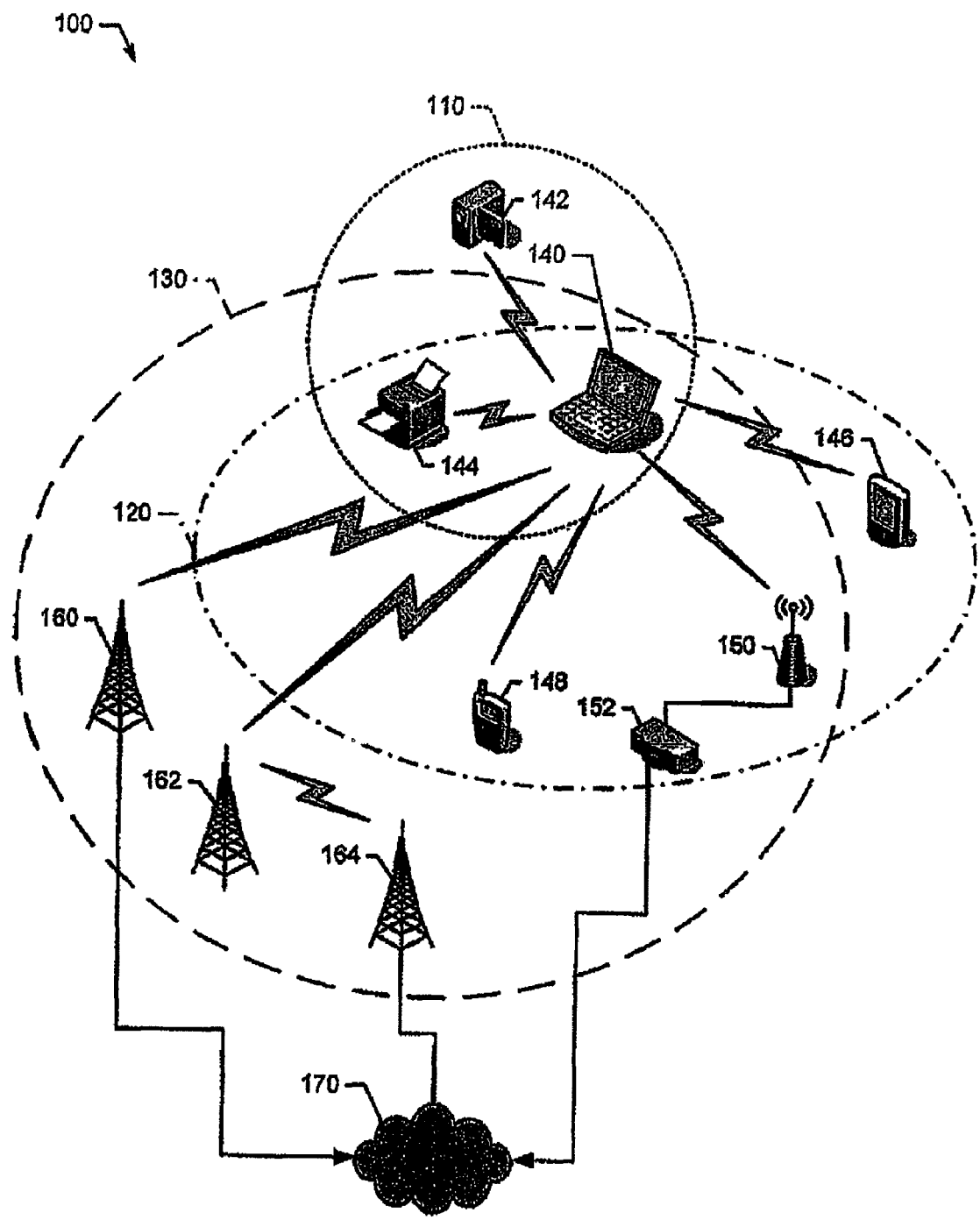
FIG. 1 illustrates an example wireless communication system in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiment of the invention, methods and apparatuses are provided that may reduce the amount of bandwidth required to provide channel quality feedback to a transmitter station from a receiver station, to enable the transmitter station to adapt and configure data signals to be transmitted to the receiver station. For the embodiments, the receiver and transmitter stations may employ a closed-loop MIMO system. In some embodiments of the present invention, a receiver station may initially transmit to a transmitter station a first CQI to indicate to the transmitter station a first modulation level and a common code rate, the first modulation level for use by the transmitter station to transmit a first stream of signals to the receiver station, and the common code rate for use by the transmitter station to transmit the first and k−1 additional streams of signals to the receiver station, where k is an integer greater than 1. The receiver station may further transmit to the transmitter station k−1 additional CQI to indicate to the transmitter station k−1 modulation levels for use by the transmitter station to transmit the k−1 streams of signals to the receiver station. In alternative embodiments of the present invention, however, the receiver station may, instead, transmit to the transmitter station a CQI that indicates a single common code rate and k modulation levels, the common code rate for use by the transmitter station for transmitting k streams of signals to the receiver station and each of the k modulation levels for use by the transmitter station for transmitting a corresponding one of the k streams of signals to the receiver station. These and other aspects of embodiments of the present invention will be described in greater detail below.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication system 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s). Further, in some instances, communication within the WMAN between, for example, base stations and subscriber stations, may be via MIMO, such as closed-loop MIMO.

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
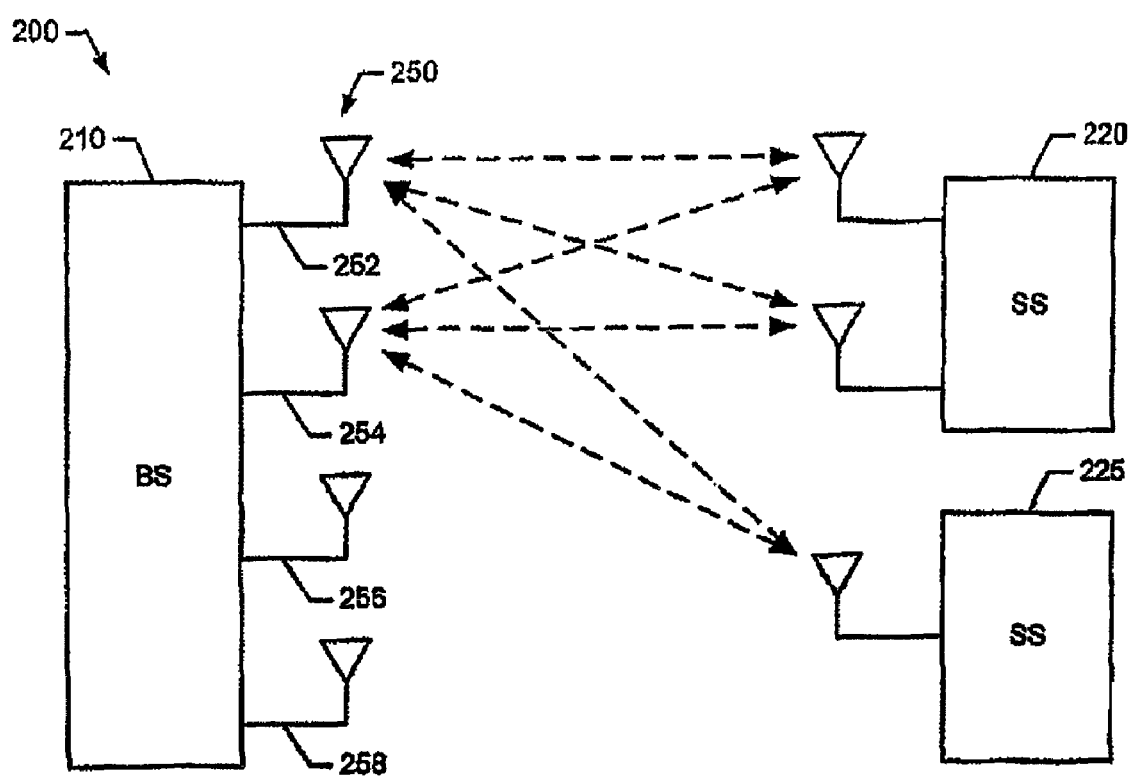
FIG. 2 illustrates an example multiple-input multiple-output (MIMO) system in accordance with various embodiments of the present invention.

Referring to FIG. 2, which illustrates an example wireless MIMO system 200 that may include a base station 210 (having multiple antennas 252-258) and one or more subscriber stations, generally shown as 220 and 225 in accordance with various embodiments of the present invention. The wireless MIMO system 200 may include a point-to-point MIMO system and/or a point-to-multiple point MIMO system. For example, a point-to-point MIMO system may include the base station 210 and the subscriber station 220. A point-to-multiple point MIMO system may include the base station 210 and the subscriber station 225. The base station 210 may transmit data streams to the subscriber stations 220, 225 simultaneously via multiple spatial channels. For example, the base station 210 may transmit two data streams (via two spatial channels) to the subscriber station 220 and one data stream to the subscriber station 225 (via one spatial channel). Each spatial channel linking the subscriber stations 220 and 225 to the base station 210 may each be associated with an antenna of the receiving stations (e.g., subscriber stations 220 and 225). Thus, in this case, subscriber station 220 is linked to base station 210 via two spatial channels while subscriber station 225 is linked to base station 210 via one spatial channel. Although FIG. 2 may depict two subscriber stations 220 and 225, the wireless MIMO system 200 may include additional subscriber stations in alternative embodiments. Further, although subscriber station 220 is depicted as having two antennas and subscriber station 225 is depicted as having one antenna, in alternative embodiments, the subscriber stations 220 and 225 may have other number of antennas. Similarly, in alternative embodiments, the base station 210 may have other number of antennas rather than the four antennas depicted in FIG. 2.

If the MIMO system 200 is a closed-loop MIMO system then prior to, for example, the base station 210 (i.e., transmitter station) transmitting data signals to subscriber station 220 (i.e., receiver station), the subscriber station 220 may measure previously received signals from the base station 210 received via the spatial channels linking the two. Based on the received signals, the subscriber station 220 may determine the channel qualities of the two spatial channels. As a result of the channel quality determinations, the subscriber station 220 may transmit to the base station 210, feedback information containing at least two CQIs for the two spatial channels. In some embodiments, the two CQIs may include modulation coding schemes (MCSs) for the two spatial channels. Once the base station 210 receives the two CQIs from the subscriber station 220, the base station 210 may set the modulation levels and the code rates for the spatial channels to be used for transmitting data signals to the subscriber station 220.

Figure 3:
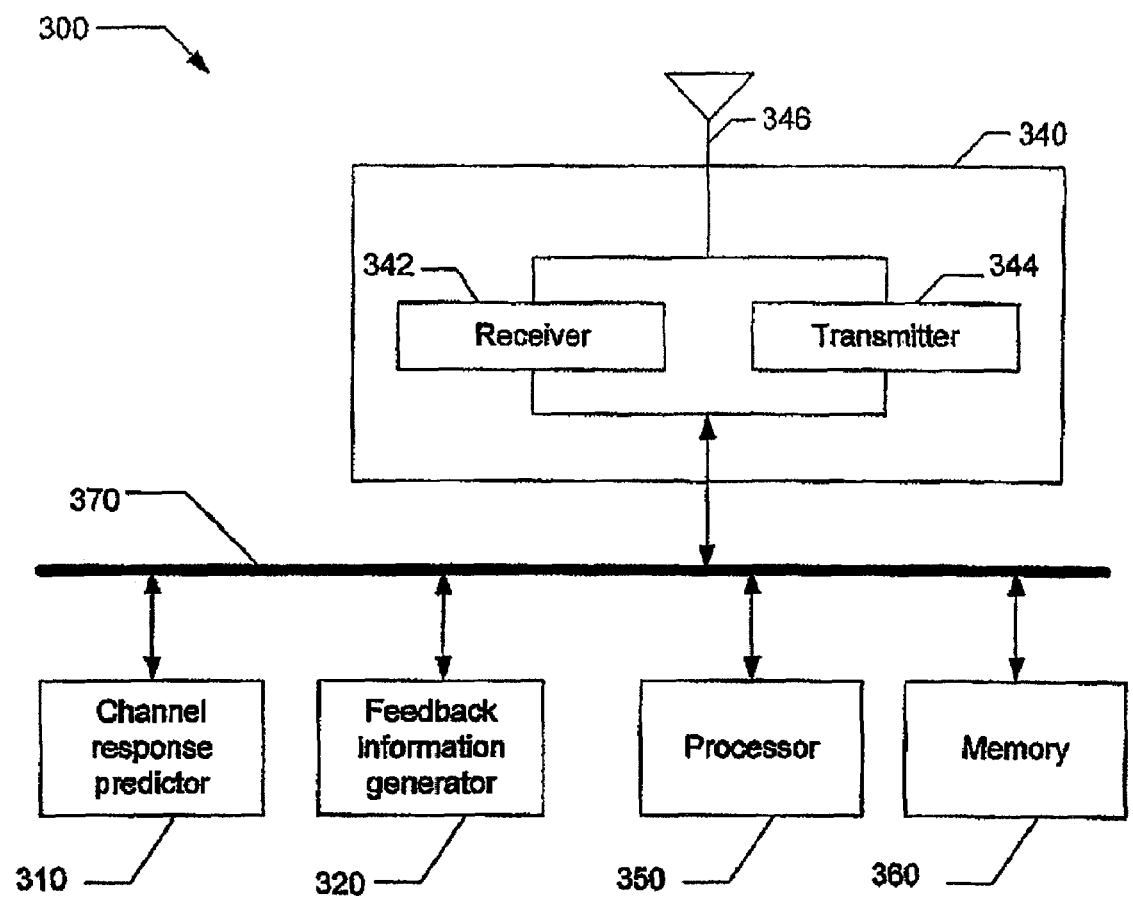
FIG. 3 illustrates an example subscriber station in accordance with various embodiments of the present invention.

FIG. 3 illustrates a subscriber station in accordance with various embodiments of the present invention. The subscriber station 300 may include a channel response predictor 310, a feedback information generator 320, a network interface device (NID) 340, a processor 350, and a memory 360. The channel response predictor 310, the feedback information generator 320, the NID 340, the processor 350, and the memory 360 may be operatively coupled to each other via a bus 370. While FIG. 3 depicts components of the subscriber station 300 coupled to each other via the bus 370, these components may be operatively coupled to each other via other suitable direct or indirect connections (e.g., a point-to-point connection or a point-to-multiple point connection).

The NID 340 may include a receiver 342, a transmitter 344, and an antenna 346. The subscriber station 300 may receive and/or transmit data via the receiver 342 and the transmitter 344, respectively. The antenna 346 may include one or more directional or omnidirectional antennas such as dipole antennas, monopole antennas, patch antennas, loop antennas, microstrip antennas, and/or other types of antennas suitable for transmission of radio frequency (RF) signals. Although FIG. 3 depicts a single antenna, the subscriber station 220 may include additional antennas. For example, the subscriber station 300 may include a plurality of antennas to implement a multiple-input multiple-output (MIMO) system.

Although the components shown in FIG. 3 are depicted as separate blocks within the subscriber station 300, the functions performed by some of these blocks may be integrated within a single semiconductor circuit or may be implemented using two or more separate integrated circuits. For example, although the receiver 342 and the transmitter 344 are depicted as separate blocks within the NID 340, the receiver 342 may be integrated into the transmitter 344 (e.g., a transceiver). The present invention described herein is not so limited.

In general, channel quality indicator (CQI) feedback, as briefly introduced previously, is widely used in WMAN systems for scheduling and link adaptation. It consumes most of the feedback bandwidth. For open-loop multiple-input multiple-output (MIMO) system, CQI for each antenna (or spatial channel or layer) is fed back from a receiver station (i.e., subscriber station) to a transmitter station (i.e., base station) based on the measurements of previously received signals received by the receiver station from the transmitter station via the spatial channels linking the two. Such measurements may allow the receiver station to determine the channel qualities of the spatial channels. In conventional MIMO systems, because the CQIs of the antennas of the MIMO link can be in any order, feedback provided back to the transmitter station (i.e., base station) may consume more bits than those when the qualities are ordered. For closed-loop MIMO, when beamforming vectors for each of the spatial channels formed by the antennas are provided by a subscriber station and fed back to a base station, they may be arranged in order according to channel qualities of the spatial channels that are associated with the beamforming vectors. Given the beamforming vectors are already fed back, the CQIs that are fed back to the base station and that correspond to the beamforming vectors (as well as their associated spatial channels) may also be ordered. Leveraging on the order, the bits needed for the CQIs that are fed back to the base station, thus in turn, the overall bandwidth required, may be reduced in accordance with various embodiments of the present invention.

Figure 4:
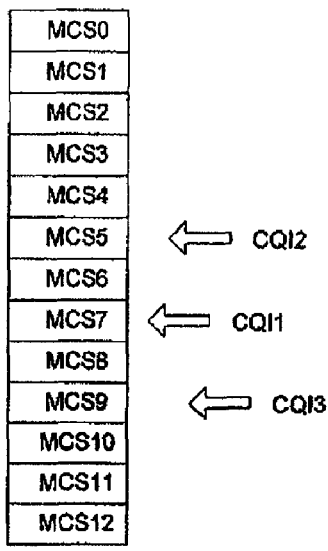
FIG. 4 illustrates channel quality indicators (CQIs) specifying modulation coding scheme (MCS) entries in a table having ordered MCS entries according to conventional techniques.

An example of CQI for per antenna rate control (PARC) system and open loop MIMO is illustrated in FIG. 4. In particular, FIG. 4 shows a table comprising a plurality of ordered MCS entries, each of the MCS entries being associated with a different level of channel quality. As depicted, there are 32 entries in the table and each entry correspondingly identifying a different MCS. The channel quality decreases with the entry index. For example, entry thirty one, which is at the bottom of the table (i.e., MCS31), may be associated with the best quality channel among a set of exemplary spatial channels associated with the MCS entries of the table while entry zero, at the top of the table (i.e., MCS0), may be associated with the worst quality channel among a set of exemplary spatial channels associated with the MCS entries of the table. Thus, in this table, MCS31 is a higher order entry than MCS0. Similarly, MCS9 is a higher order entry than MCS7. Resultantly, the table depicted in FIG. 4 shows a plurality of ordered MCS entries. Each of the MCS entries in the table may be associated with a modulation level and a forward error correction (FEC) code rate. Thus, although not depicted, the table essentially has two dimensions, one along the modulation level and the other along the FEC code rate. The two dimensions collapse into one sorted by the channel quality. Thus, each combination of modulation level and code rate may map to one channel quality. As a result, a lower modulation level and/or a lower code rate may be employed for a spatial channel with lower quality.

As previously described, a subscriber station (e.g., the subscriber station 220 of FIG. 2) may feed back a CQI for each of its spatial channels to facilitate data signal transmission from the base station (e.g., base station 210). For example, suppose subscriber station 220 has three antennas instead of the two as depicted in FIG. 2, the subscriber station 220 may then send to the base station 210 three CQIs (i.e., CQI 1, CQI 2, and CQI3) for three spatial channels (e.g., spatial channels 1, 2, and 3) prior to the base station 210 sending data signals to the subscriber station 220. Under conventional techniques, the three CQIs provided back to the base station 210 may be in random order. Thus, CQI 1, CQI 2, and CQI 3 that are transmitted back to the base station 210 will, as depicted in FIG. 4, identify entries for MCS7, MCS5, and MCS9, respectively.

The CQIs may identify MCS entries either directly or indirectly by, for example, indexing to a plurality of ordered MCS entries as shown in FIG. 4. Some conventional systems may use 5, 3, and 3 bits to identify the three MCS entries for the three CQIs. That is, both the base station 210 and the subscriber station 220 may be provisioned with a table of ordered MCS entries such as depicted in FIG. 4 that, together with the 5, 3, and 3 bit CQIs provided by the subscriber station 220, may allow the base station 210 to be able to determine the MCS entries specified by the CQIs having 5, 3, and 3 bits. For example, in conventional systems, CQI 1 may include 5 bits (e.g., $2^5=32$ entries) to directly identify an MCS entry among 32 MCS entries, and CQI 2 (or 3) may include 3 bits to indirectly identify another entry in an 8-entry neighborhood of CQI 1's entry. Because of the random nature of conventional systems, under conventional systems, CQI 3 (as well as CQI 2) can identify an MCS entry that is a lower or a higher order MCS entry than the MCS entry identified by CQI 1. In this case, CQI 3 identifies entry MCS9 which is a higher order entry than the entry (i.e., entry MCS 7) identified by CQI 1. Because of the greater dynamic range or variation of CQI 3 and CQI 2, with respect to CQI 1, more bits may be needed to specify them as compared to, for example, if the CQI 3 and CQI 2 could only be smaller than CQI.

In general, the methods and apparatuses described herein may reduce the amount of bandwidth required for channel feedback for beamformed MIMO systems. The methods and apparatuses described herein are not limited in this regard. For beamformed (or precoded) MIMO, beamforming vectors for a set of spatial channels may be fed back to a transmitter station from a receiver station and the vectors may be ordered in accordance with channel quality. This means that the quality of the spatial channel that corresponds to a first beamforming vector may be the best among a set of spatial channels and the quality of the spatial channel that corresponds to a second beamforming vector may be the second best among the set of spatial channels, wherein the set of spatial channels may communicatively link the receiver station to the transmitter station. As a result, the CQIs associated with the set of spatial channels and their associated beamforming vectors may also be ordered. Note that a channel quality may be measured at the output of a MIMO decoder that may employ zero-forcing, Minimum Mean Square Error (MMSE), successive interference cancellation, parallel interference cancellation, and/or other processes.

Figure 5:
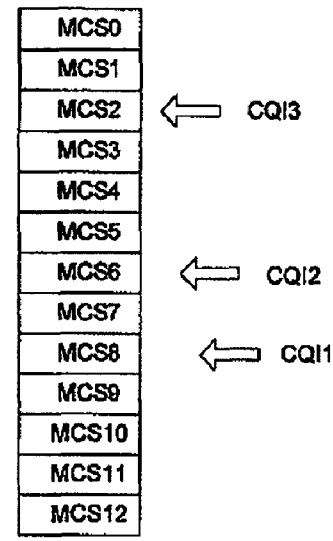
FIG. 5 illustrates CQIs specifying MCS entries in a table having ordered MCS entries in accordance with various embodiments of the present invention.

Because of the ordered beamforming vectors provided to the transmitter station (i.e., base station 210), a determination can be made at the transmitter station as to which CQI from the group of CQIs received from the receiver station (e.g., subscriber station 220) will be associated with the highest quality spatial channel among the set of spatial channels communicatively linking the transmitter station to the receiver station. The CQI determined to be associated with the highest quality channel may also specify, in a plurality of ordered MCS entries, the highest ordered MCS entry relative to the other MCS entries to be directly or indirectly identified by the other CQIs. This is illustrated in FIG. 5 in which CQI 1 directly identifies the highest MCS entry relative to the MCS entries that may be indirectly identified by CQI 2 and CQI 3. Notice that the words "directly" and "indirectly" are used here. This is because, CQI 1 may need five bits to identify an MCS entry (thus "directly" identify) from the 32 entries while CQI 2 and CQI 3 may need fewer bits to identify their corresponding MCS entries (thus "indirectly" identify) since the MCS entries for CQI 2 and CQI 3 will be lower order MCS entries relative to the MCS identified by CQI 1. That is, the MCS entries for CQI 2 and CQI 3 will be, in the ordered MCS entries table, lower ordered MCS entries relative to the MCS entry identified by CQI 1. Thus, the MCS entries for CQI 2 and 3 will not have to be fully identified (i.e., 5 bit identification) because the MCS entries for CQI 2 and 3 can be identified by referencing or indexing them relative to the MCS entry identified by CQI 1 as will be described in greater detail below. As a result, CQI 2 and CQI 3 may need fewer bits for identification of their respective MCS entries so long as the identity of the MCS entry for CQI 1 is known. Thus, according to various embodiments of the present invention, this order of the CQIs may be exploited in order to reduce the amount of bandwidth required for CQI feedback for the beamformed spatial channels.

Figure 6A:
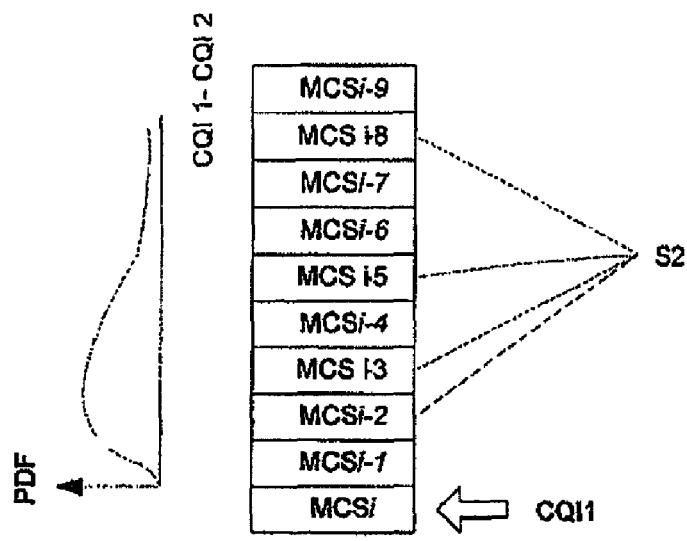
FIG. 6A illustrates an MCS probability density distribution and a selected subset of non-continuous lower ordered MCS entries in accordance with various embodiments of the present invention.

The reduction in bandwidth required for CQI feedback may be further facilitated by generically or non-generically determining a probability density distribution (i.e., probability density function) for a second spatial channel given a first spatial channel as illustrated in FIG. 6A. Such a statistical distribution may also be an MCS probability density distribution for a second MCS entry given a first MCS entry. By generating such a statistical distribution, the bits needed in order to identify a second MCS entry (as indirectly identified by a second CQI, i.e., CQI 2) given a first MCS entry (as directly identified by a first CQI, i.e., CQI 1) may be reduced. Such a statistical distribution may be generated by, for example, randomly generating many beamformed channels and computing a first and a second CQI (CQI 1 and CQI 2) both using 5 bits, and collecting the statistics about the difference between CQI 1 and 2, i.e., CQI 1–CQI 2. The empirical probability density distribution of the difference can then be computed. The MCS probability density distribution may then be used to pre-determine a selected subset of non-continuous lower ordered MCS entries depicted as S2 in FIG. 6A. Note that the terms probability density distribution and probability density function will be used, herein, interchangeably, and are therefore, synonymous.

Members of the selected subset of non-continuous lower ordered MCS entries (herein "selected subset") are candidate MCS entries, one of which may be indirectly identified by CQI 2. Given the size of S2, e.g., 4, the pattern of S2 can be computed. In this illustration, the first MCS entry is MCS i (as identified by CQI 1). Given the first MCS, MCS i, the four members of the selected subset based on the statistical distribution are entries MCS i-2, MCS i-3, MCSi-5, and MCS i-8, which are successively lower ordered MCS entries. In some embodiments, the selected subset of MCS entries, MCS i-2, MCS i-3, MCSi-5, and MCS i-8, may be generic, thus may be used regardless of the value of the first MCS (i.e., the value of "i" in MCS i). Alternatively, the selected subset of MCS entries may not be generic and may be dependent upon the value of the first MCS. Although the selected subset of MCS entries, MCS i-2, MCS i-3, MCSi-5, and MCS i-8, are suc-cessively lower ordered MCS entries, some successive members of the selected subset may not be immediately successive.

For example, a non-member of the subset, entry MCS i-4, is between subset members MCS i-3 and MCS i-5. Similarly, non-members of the subset, entries MCS i-6 and MCS i-7, are between subset members MCS i-5 and MCS i-8. This is as a result of the MCS probability density distribution and the lower probability density as you move away from the given first MCS entry (i.e., MCS i). As a result, the selected subset is non-continuous. However, in alternative embodiments, the selected subset may be continuous (i.e., no non-members disposed between the members of the selected subset).

Further, the MCS entries of the selected subset are lower ordered MCS entries because members of the subset are of lower order than the first MCS entry (i.e., MCS i). In this example, CQI 1 may directly index the first MCS entry (MCS i) in a plurality of ordered MCS entries (i.e., the table of FIG. 6A), while CQI 2 may indirectly index a second MCS entry that is from within the selected subset of non-continuous lower ordered MCS entries relative to the indexed first MCS entry.

Note that the MCS probability density distribution and/or the selected subset, as previously alluded to, may be generic, thus the MCS probability density distribution and/or the selected subset may be used to determine a third MCS entry for a third CQI (CQI 3) given the second MCS entry (as indirectly identified by CQI 2). Of course, once the third MCS entry is determined for the third CQI, the third CQI, which may indirectly identify the third MCS entry, may be transmitted to the transmitter station. This process for indirectly identifying MCS entries for CQIs other than CQI 1 (associated with the highest quality channel) may be repeated over and over again for additional CQIs if additional CQIs for additional spatial channels are to be transmitted to the transmitter station using the same generic MCS probability density distribution and/or the selected subset. Alternatively, the MCS probability density distribution and/or the selected subset may not be generic and may be dependent upon, for example, the value of first CQI (e.g., first MCS identified by the first CQI). In such cases, the MCS probability density distribution and/or the selected subset may need to be determined for each additional CQI.

In some embodiments, the MCS probability density distribution and/or the resulting selected subset may be generated by the receiver station (e.g., subscriber station 220) and the transmitter station (e.g., base station 210) may be provisioned with the MCS probability density distribution and/or the selected subset to facilitate the transmitter station to determine the MCS entries that may be indirectly identified by CQIs provided by the receiver station.

Figure 6B:
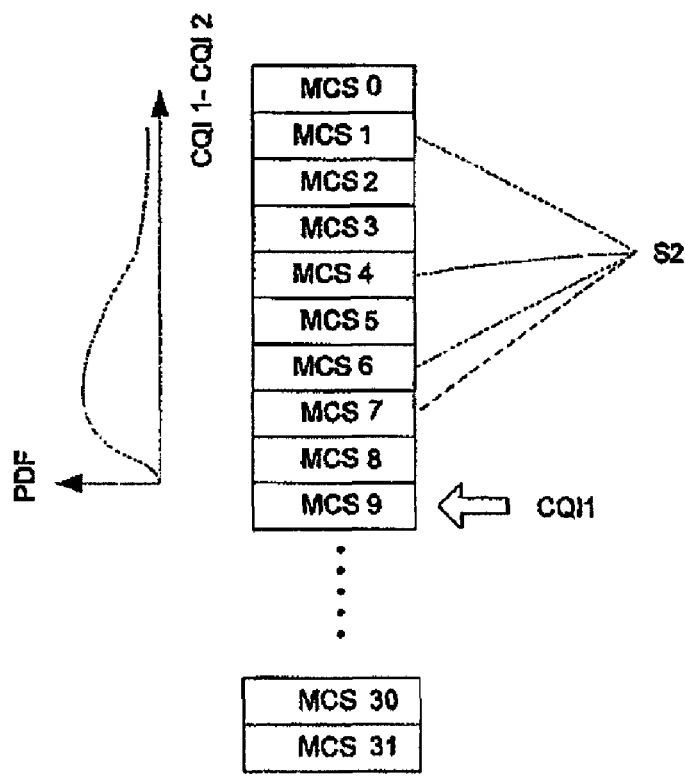
FIG. 6B illustrates the MCS probability density distribution and the selected subset of non-continuous lower ordered MCS entries of FIG. 6A superimposed on top of the tables of FIGS. 4 and 5 in accordance with various embodiments of the present invention.

An example of how the probability density distribution and the resulting selected subset of lower ordered MCS entries (S2) may reduce the bit requirement for CQIs is described as follows with reference to FIG. 6B. In particular, FIG. 6B illustrates the ordered MCS entries table of FIGS. 4 and 5 with the probability density distribution and the selected set (S2) of FIG. 6A superimposed on top of the table. Suppose a first CQI (CQI 1) associated with a highest quality channel of a set of spatial channels (i.e., set of spatial channels linking a receiver station to a transmitter station) requires 5 bits in order to directly identify one MCS entry out of the 32 MCS entries, in this case, MCS9. In order for the second CQI (CQI 2) to indirectly identify a second MCS entry, a selected subset of entries, S2, may be determined based at least on the MCS probability density distribution. Members of S2, in this case are entries MCS7, MCS6, MCS4, and MCS1. S2, as depicted, has only four entries instead of eight as was the case of conventional systems as described previously for FIG. 4.

As a result, only two bits (rather than the three bits needed for conventional systems) may be needed in order to at least indirectly identify the second MCS entry for CQI 2. That is, if the transmitter device (i.e., base station 210) receiving the CQI 2 (with the two bits indirectly identifying the second MCS entry) is already provisioned with the ordered MCS entries table (of FIGS. 4, 5, and 6B), and the probability density distribution or the selected subset of FIG. 6A, it can determine the identity of the second MCS, as indirectly identified by CQI 2, given the first MCS as directly identified by CQI 1. Similarly, for CQI 3, the select subset of non-continuous lower ordered MCS entries, if the selected subset is generic, may be used to facilitate identification of a third MCS entry that is indirectly identified with a two bit CQI 3 given the second MCS entry that was indirectly identified by CQI 2.

On the other hand, if the MCS probability density distribution and/or the selected subset are not generic, than a new MCS probability density distribution and/or the selected subset may be determined for CQI 3, given CQI 2. The determination of the MCS probability density distribution may be performed, in some embodiments, while offline. In such a scenario, once the selected subset is determined based on the MCS probability density distribution determined offline, the receiver station may generate and provide a feedback (i.e., CQI indirectly identifying an MCS) according to the subset and the transmitter station may then select a MCS according to the subset and the feedback, which may occur during usage mode (i.e., when online).

It should be noted that it may be possible that for the second CQI, CQI 2, the actual MCS entry should be an MCS entry other than those included in the selected subset (i.e., MCS7, MCS6, MCS4, and MCS1). For example, suppose the actual MCS entry for CQI 2 should be MCS2, which is not a member of the selected subset. Such a discrepancy may be ignored since the MCS entry can be rounded to a selected subset member, such as MCS1. Further, the MCS entry (i.e., MCS1) to be indirectly identified by CQI 2 using the rounding-off approach, which again may not be the actual MCS value, may be associated with a very low quality channel thus resulting in such a spatial channel not being used at all since such a spatial channel may be undesirable for transmitting data signals. Thus, the rounding-off approach, particularly when used for lower ordered MCS entries, may not impact the overall performance of a closed-loop MIMO system. Note that in some embodiments, one of the MCS entries of the selected subset may be reserved for no data transmission for the corresponding spatial channel, i.e. spatial channel 2.

Although in some embodiments of the present inventions the methods and apparatuses described in this description may be associated with the Third Generation Partnership Project (3GPP) for the Long Term Evolution (LTE), the methods and apparatuses described in this description may be readily applicable with other suitable wireless technologies, protocols, and/or standards.

The above approaches for reducing the bandwidth needed for CQI feedback may be further facilitated or enhanced by using the methods and/or the apparatuses to be described below. As previously described, in conventional closed loop MIMO system, a CQI may typically identify a quality indicator such as a MCS, which may further indicate two parameters or codewords, a modulation level and a FEC code rate (i.e., code rate). Consequently, a conventional CQI indicates or specifies a modulation level and a code rate to be used by a transmitter station for configuring and adapting a stream of signals to be transmitted through a spatial channel to the receiver station.

Further, in conventional closed-loop MIMO systems, the systems may operate in multiple codeword mode in which, at any given period or increment of time, the receiver station sends to the transmitter station multiple FEC codewords (i.e., FEC code rates) across multiple spatial channels in parallel. In contrast, and in accordance with various embodiments of the present invention, in a single codeword mode, the receiver station may send to the transmitter station only a single FEC code rate over a single spatial channel at any given period or increment of time, the single FEC code rate (herein "common code rate" may be used by the transmitter station for transmitting multiple streams of signals over multiple spatial channels. According to various embodiments of the invention, the results of using a single common code rate for transmitting multiple streams of signals by a transmitter station may be very close to the results obtained by using multiple code rates.

In particular, a receiver station that is communicatively linked to a transmitter station via k spatial channels may transmit a first CQI to the transmitter station that indicates a modulation level for use by the transmitter station to transmit (i.e., to configure for transmission) a first of k streams of signals to be transmitted to the receiver station. The first CQI may further include a common code rate to be used by the transmitter station for transmitting the first of the k streams of signals as well as for transmitting the rest of the k−1 additional streams of signals to the receiver station. The receiver station may further transmit to the transmitter station k−1 additional CQIs to indicate to the transmitter station the k−1 modulation levels to be used by the transmitter station for transmitting the k−1 additional streams of signals to the receiver station.

Alternatively, the receiver station may transmit a single CQI to the transmitter station that indicate a single common code rate and multiple k modulation levels, wherein the common code rate may be used by the transmitter station for transmitting k streams of signals to the receiver station and each of the k modulation levels to be used by the transmitter station for transmitting a corresponding one of the k streams of signals to the receiver station. In either of the above two methods, the common code rate and the modulation levels may be indicated in the CQIs by indexing to them. Further, since the qualities of spatial channels may vary over time, in both of the above methods, the transmission of the CQIs or CQI may occur during a first time increment, and the processes may be repeated for transmitting another set of CQIs or another CQI during a second time increment following the first time increment. This can be repeated over and over again for additional increments of time.

Figure 7A:
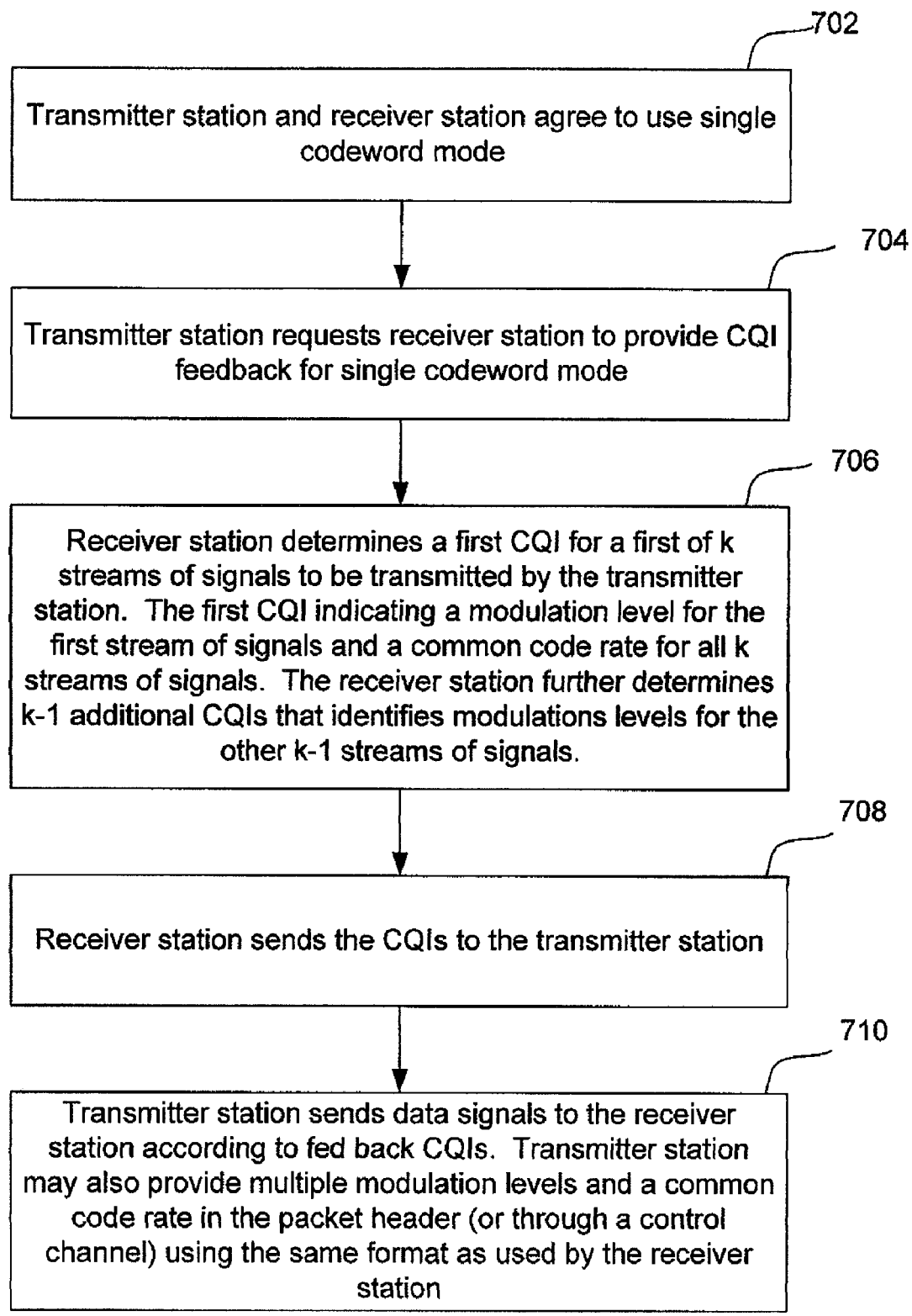
FIG. 7A illustrates a process in accordance with various embodiments of the present invention.
Figure 7B:
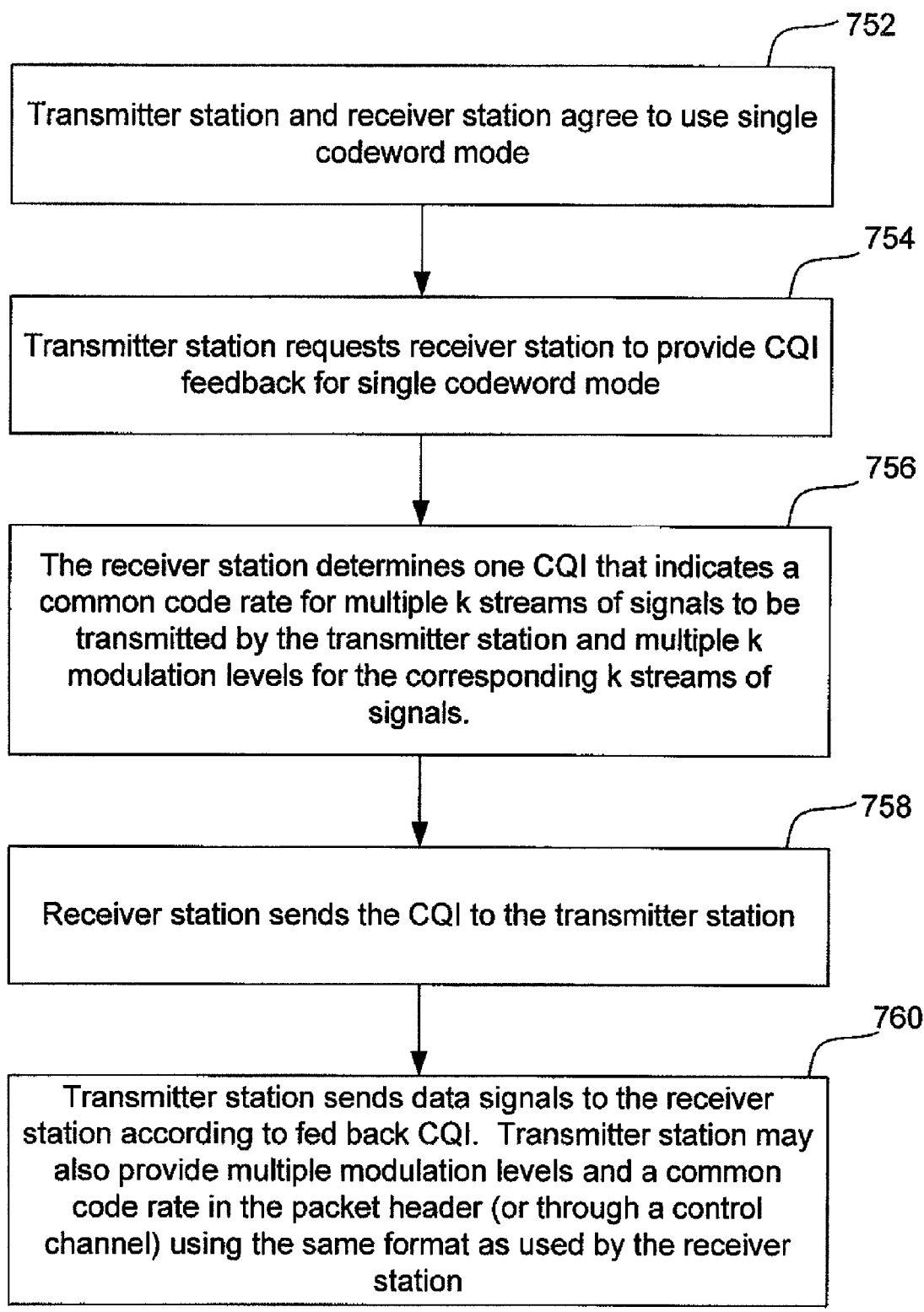
FIG. 7B illustrates another process in accordance with various embodiments of the present invention.

FIGS. 7A and 7B depict two processes in accordance with various embodiments of the present invention. The example processes 700 and 750 of FIGS. 7A and 7B may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application-specific integrated circuit (ASIC), an erasable programmable read only memory (EPROM), a read only memory (ROM), a random access memory (RAM), a magnetic media, an optical media, and/or any other suitable type of medium.

Process 700 may begin when a transmitter station and a receiver station agree to employ a single codeword mode to transmit k streams of signals from the transmitter station to the receiver station via k spatial channels at 702. The transmitter station may then make a request to the receiver station to provide CQI feedback for the single codeword mode at 704. Upon getting the request, the receiver station may determine a first CQI for a first of the k streams of signals to be transmitted by the transmitter station, the first CQI indicating a modulation level for use by the transmitter station to transmit the first of the k streams of signals to be transmitted to the receiver station, and a common code rate for use by the transmitter station to transmit all of the k streams of signals (i.e., the first and k−1 additional streams of signals). The receiver station may further determine k−1 additional CQIs that indicate modulation levels for use by the transmitter station for transmitting the other k−1 streams of signals at 706. Thus the k−1 additional CQIs may be single codeword CQIs that only specify modulation levels but may not specify code rates. After the CQIs have been determined, the receiver station may then send the CQIs to the transmitter station at 708.

In accordance with various embodiments of the present invention, the k−1 additional CQI to be transmitted to the transmitter station may each have a data size of two bits to indicate a selection from one of three or four candidate modulation levels for the transmitter station. For example, for 3GPP LTE, if the transmitter and receiver stations are part of a WiMAX network, then each of the k−1 additional CQIs may indicate a selection from three possible modulation levels of QPSK, 16 QAM, and 64 QAM. On the other hand, if the transmitter and receiver stations are part of a Wi-Fi network then each of the k−1 additional CQIs may indicate a selection from four possible modulation levels BPSK, QPSK, 16 QAM, and 64 QAM. In order to facilitate the process 700, the receiver station may directly or indirectly inform the transmitter station an order of the k spatial channels with respect to the k spatial channels' qualities relative to each other. As previously described, this can be accomplished, for example, by the receiver station providing to the transmitter station ordered beamforming vectors associated with the k spatial channels.

In some alternative embodiments of the invention, each of the k−1 additional CQI to be transmitted to the transmitter station has a data size of 1 bit to indicate to the transmitter station whether to use a same or a lower modulation level as a modulation level indicated by another CQI, the other CQI being one of the other k−1 additional CQI or the first CQI to be transmitted to the transmitter station, wherein each of the k−1 additional CQI may be associated with a corresponding quality ordered spatial channel that immediately succeeds another quality ordered spatial channel associated with the other CQI.

In other words, since each CQI is associated with a corresponding spatial channel, the CQIs themselves can be ordered if their corresponding spatial channels are ordered via, for example, the ordered beamforming vectors. Using the ordering of the spatial channel (as well as the CQIs), only 1 bit may be needed to specify or indicate a modulation level for a CQI. For example, suppose there are three CQIs (i.e., CQI 1, CQI 2, and CQI 3) to be transmitted from the receiver station to the transmitter station, the three CQIS being associated with three corresponding spatial channels. Suppose further that CQI 1 is associated with the highest quality spatial channel, CQI 2 associated with the second highest quality spatial channel (i.e., the spatial channel of CQI 2 immediately succeeds the highest quality spatial channel of CQI 1), and CQI 3 is associated with lowest quality spatial channel (i.e., the spatial channel of CQI 3 immediately succeeds the second highest quality spatial channel of CQI 2). Given the modulation level indicated by CQI 1, only 1 bit may be needed in order to indicate the modulation level of CQI 2. If the 1 bit is set at logic "0", for example, it may indicate that the modulation level of CQI 2 is equal to the modulation level of CQI 1. On the other hand, if the 1 bit is set at logic "1", it may indicate that the modulation level of CQI 2 is one or two modulation level lower than the modulation level of CQI 1. Similarly, only 1 bit may be needed to indicate the modulation level of CQI 3 or any other CQIs associated with spatial channels that are lower quality spatial channels than the spatial channel associated with CQI 1.

Referring back to the process 700 of FIG. 7A, after receiving the CQIs from the receiver station, the transmitter station may send data signals to the receiver station according to the fed back CQIs. In various embodiments of the present invention, the transmitter station may also provide multiple modulation levels and a common code rate in the packet header (or through a control channel) using the same format as used by the receiver station at 710.

Similar to process 700, process 750 of FIG. 7B may begin when a transmitter station and a receiver station agree to employ a single codeword mode to transmit k streams of signals from the transmitter station to the receiver station via k spatial channels at 752. The transmitter station may then make a request to the receiver station to provide CQI feedback for single codeword mode at 754. Upon getting the request, the receiver station may determine one CQI that indicates a common code rate and multiple k modulation levels, the common code rate for use by the transmitter station for transmitting multiple k streams of signals to the receiver station and each of the k modulation levels for use by the transmitter station for transmitting a corresponding one of the k streams of signals to the receiver station at 756. After determining the CQI, the receiver station may send the CQI to the transmitter station at 758.

In some embodiments of the present invention, the CQI transmitted by the receiver station may include two bits per each of k−1 of the k modulation levels to be indicated by the CQI. Each of the two bits may indicate a selection from one of three candidate modulation levels for the transmitter station as previously described for process 700 (i.e., for 3GPP LTE, each of the k−1 additional CQIs may indicate a selection from three possible modulation levels of QPSK, 16 QAM, and 64 QAM). In some embodiments, in order to facilitate the process 700, the receiver station may directly or indirectly inform the transmitter station an order of the spatial channels with respect to the spatial channels' qualities relative to each other. This can be accomplished by, for example, the receiver station providing to the transmitter station ordered beamforming vectors associated with the spatial channels.

In some alternative embodiments of the invention, the CQI may include only 1 bit per each of k−1 of the k modulation levels to be indicated by the CQI. In particular, each of the k−1 modulation levels to be indicated by the CQI using 1 bit each may be associated with a corresponding quality ordered spatial channel that immediately succeeds another quality ordered spatial channel associated with another modulation level indicated by the CQI. In some embodiments, if the 1 bit for any one of k−1 modulation level is set at logic "0", it may indicate that that modulation level is equal to the modulation level of the other modulation level indicated by the CQI. On the other hand, if the 1 bit is set at logic "1", it may indicate that that modulation level is one or two modulation level lower than the other modulation level indicated by the CQI.

After receiving the CQIs from the receiver station, the transmitter station may send data signals to the receiver station according to the fed back CQI. The transmitter station may also provide multiple modulation levels and a common code rate in the packet header (or through a control channel) using the same format as used by the receiver station at 760.

Again note that since the qualities of spatial channels may vary over time, CQIs for the spatial channels linking the receiver station to the transmitter station may be continuously or periodically provided from the receiver station to the transmitter station. Thus, the processes 700 and 750 depicted in FIGS. 7A and 7B may be repeated over and over again in the course of time. For example, the receiver station may transmit a set of CQIs for corresponding spatial channels (as generated by, for example, the processes 700 or 750) to the transmitter station during a first increment of time, and may then transmit a another set of CQIs for the same spatial channels during a second increment of time later than the first increment of time. This can be repeated over and over again.

Figure 8:
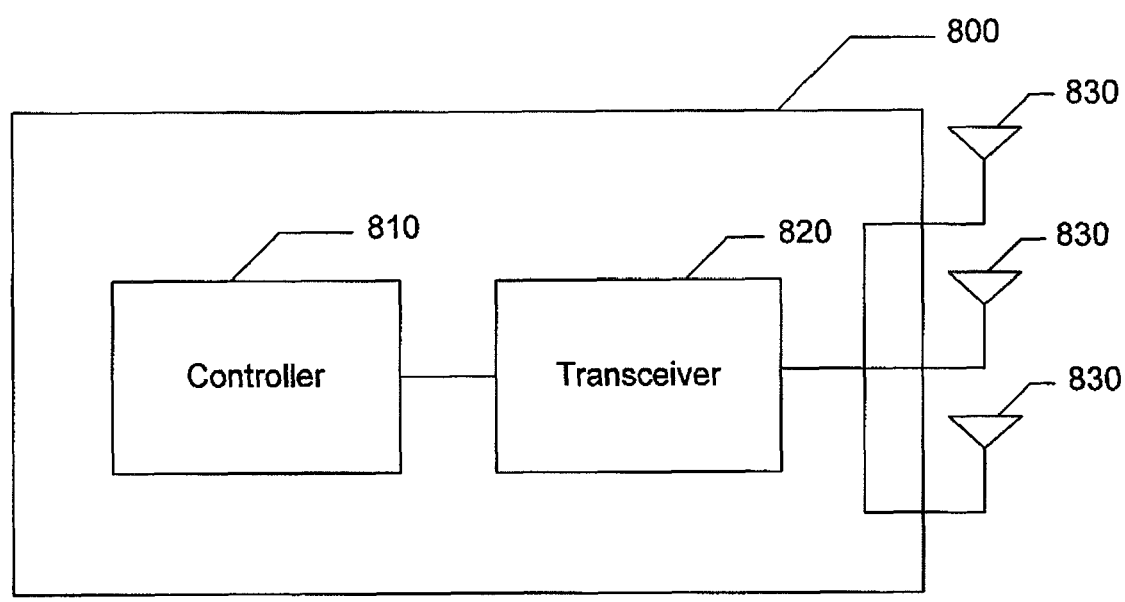
FIG. 8 illustrates an apparatus in accordance with various embodiments of the present invention.

FIG. 8 illustrates a block diagram of an apparatus in accordance with various embodiments of the present invention. For the embodiments, the apparatus 800 may be employed by or is part of, for example, a receiver station to provide, among other things, one or more CQIs to a transmitter station in accordance with the methods described above. As shown, the apparatus 800 includes a controller 810, a transceiver 820, and a plurality of antennas 830, coupled together as shown. The plurality of antennas 830 may be designed to communicate in a wireless network such as a WMAN. Note that although three antennas 830 are depicted, in alternative embodiments, fewer or more antennas may be employed. The components of the apparatus 800 may be used to perform the various methods and operations described above.

For example, the transceiver 820 may be designed to transmit and receive signals to and from a transmitter station. The controller 810 may be designed to control the transceiver to transmit to the transmitter station a first CQI to indicate to the transmitter station at least a common code rate for use to transmit a first and k-1 additional streams of signals to the apparatus 800, where k is an integer greater than 1. The controller 810 may be further designed to control the transceiver 820 to transmit to the transmitter station k-1 additional CQI to indicate to the transmitter station k-1 modulation levels for use by the transmitter station to transmit k-1 streams of signals to the apparatus 810. As previously indicated in the processes described above, these transmissions of the CQIs may be repeated over and over again during multiple increments of time. The controller 810 may be further designed to control the transceiver 820 to transmit CQIs having data sizes of two or one bit each, in the same manner as the methods previously described, to indicate modulation levels to be used by a transmitter station for transmitting streams of signals. And to control the transceiver to directly or indirectly inform the transmitter station the order of spatial channels communicatively linking the apparatus to the transmitter station by providing beamforming vectors associated with the spatial channels in order to the transmitter station, the spatial channels being correspondingly associated with the CQIs to be transmitted by the transceiver 820.

Figure 9A:
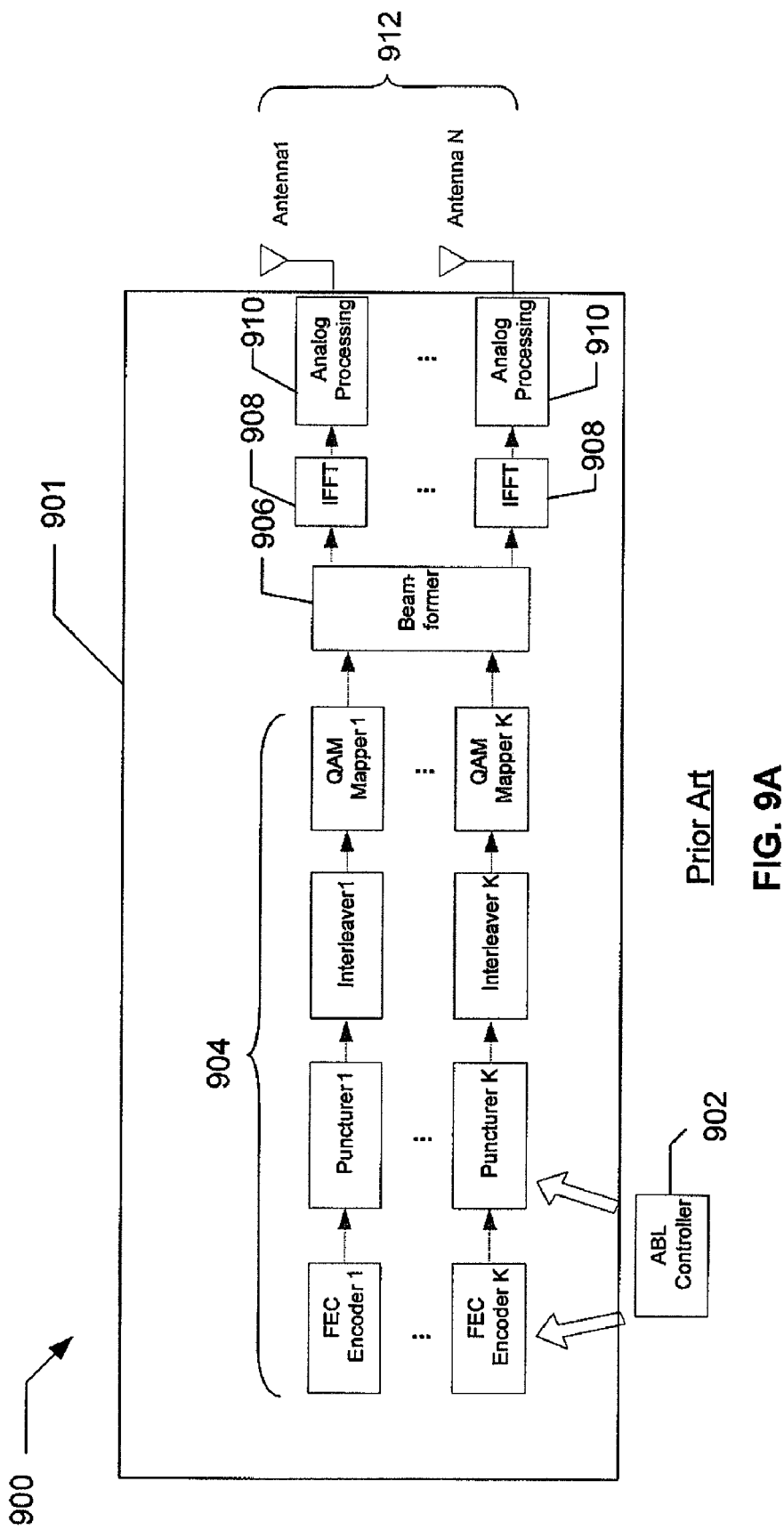
FIG. 9A illustrates a conventional multiple codeword transmitter system.

FIG. 9A illustrates a conventional multiple codeword system 900 for transmitting multiple streams of signals through multiple spatial channels. The conventional system 900 includes an adaptive bit loading (ABL) controller 902, a multiple codeword transmitter 901, and a plurality of antennas 912, as shown. The multiple codeword transmitter 901 further includes, multiple chains 904 (each chain includes a FEC encoder, a puncturer, an interleaver, and a quadrature amplitude modulation (QAM) mapper), a beamformer 906, inverse fast forward transform (IFFT) blocks 908, and analog processing blocks 910. Each chain 904 may be for transmitting a corresponding stream of signals to be transmitted.

Figure 9B:
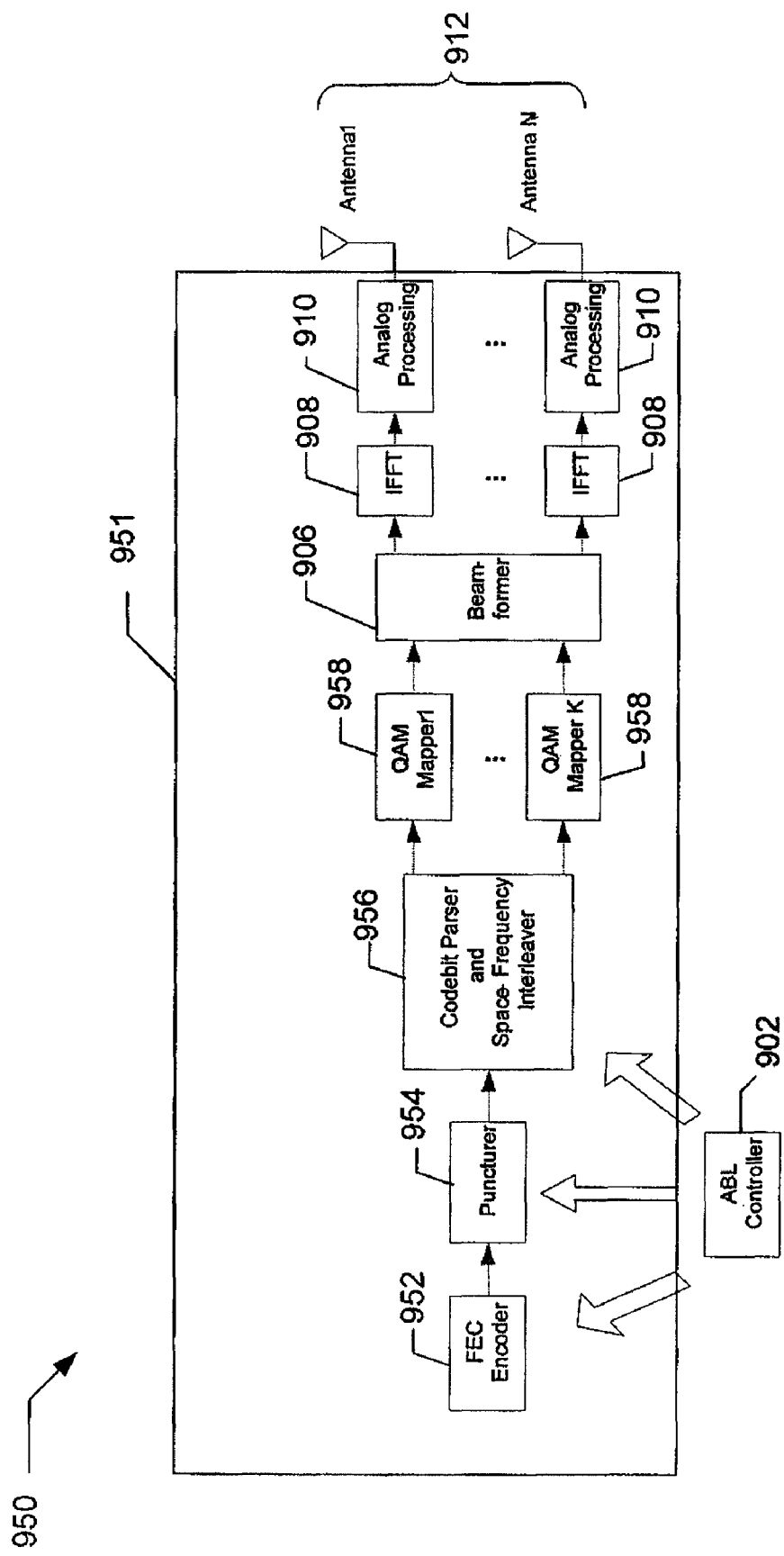
FIG. 9B illustrates a single codeword transmitter system in accordance with various embodiments of the present invention.

FIG. 9B illustrates a single codeword transmitter system 950 (herein "system") in accordance with various embodiments of the present invention. For the embodiments, the system 950 may be employed by or is part of a receiver or transmitter station such as a base or subscriber station. The system 950 includes a single codeword transmitter 951, an ABL controller 902, and a plurality of antennas 912, coupled together as shown. In various embodiments, the antennas 912 may be omnidirectional antennas. The single codeword transmitter 951 includes a common FEC encoder 952, a common puncture 954, a codebit parser and space frequency interleaver 956, QAM mappers 958, a beamformer 906, IFFT blocks 908, and analog processing blocks 910, coupled together as shown. The single codeword transmitter 951 may include, along with the components depicted, other additional components not depicted to transmit multiple streams of signals over multiple spatial channels using a common code rate and multiple modulation levels as well as to facilitate the various methods and operations previously described (i.e., providing a common code rate and multiple modulation levels to a transmitter station). For example, in some embodiments, the single code word transmitter 951 may be designed to transmit a channel quality indicator (CQI) to a transmitter station, the CQI indicating a single common code rate and k modulation levels, the common code rate for use by the transmitter station for transmitting k streams of signals to the system 950 and each of the k modulation levels for use by the transmitter station for transmitting a corresponding one of the k streams of signals to the system 950. The common FEC encoder 952 and the common puncturer 954 may be coupled together as depicted to achieve a target code rate and a common interleaver.

Figure 10:
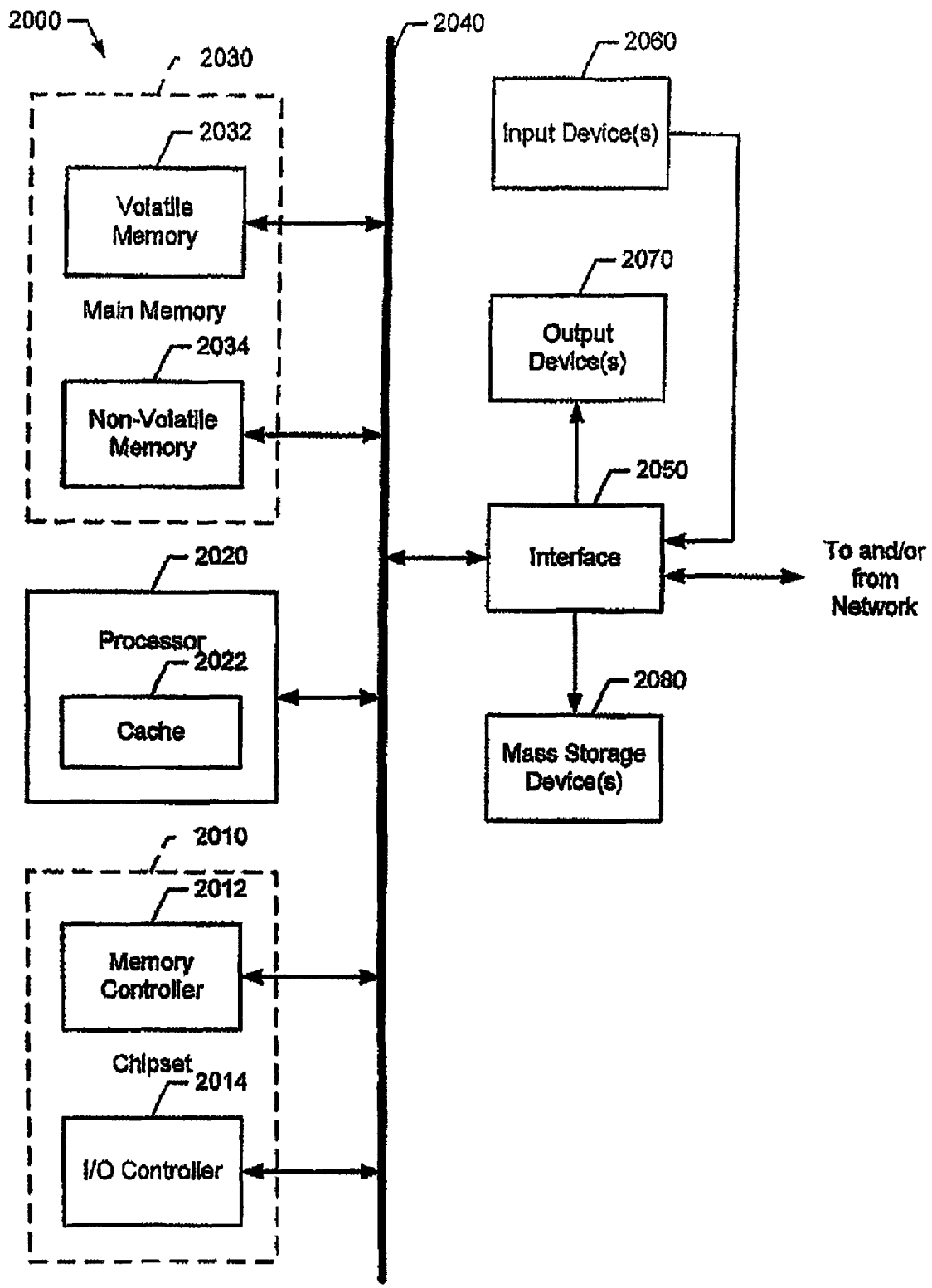
FIG. 10 illustrates an example system in accordance with various embodiments of the present invention.

FIG. 10 is a block diagram of a system 2000 adapted to implement the methods and operations described previously. The system 2000 may be a desktop computer, a laptop computer, a handheld computer, a web tablet, a personal digital assistant (PDA), a server, a set-top box, a smart appliance, a pager, a text messenger, a game device, a wireless mobile phone and/or any other type of computing device.

The system 2000 illustrated in FIG. 10 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. In some embodiments, the chipset 2010 may be a communication chipset configured to receive data signals from a transmitter station and to provide to the transmitter station channel quality indicators (CQIs). The CQIs provided to the transmitter station may be correspondingly associated with the antennas for the transmitter station and may be used by the transmitter station to select modulation coding schemes (MCSs) for use to transmit the data signals to the system. At least a first one of the CQIs provided back to the transmitter station may directly identify a first MCS among a plurality of ordered MCS entries, and a second one of the CQIs to indirectly identify a second MCS among the plurality of ordered MCS entries, the second MCS entry being one of a selected subset of non-continuous or continuous lower ordered MCS entries relative to the first MCS entry.

The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. Although not depicted, coupled to the interface circuit 2050 may be a plurality of antennas such as a plurality of omnidirectional antennas. In some embodiments, the antennas may be designed to communicate in a wireless network such as a WMAN.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 10 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising
transmitting by a receiver station, to a transmitter station, a first channel quality indicator (CQI) to indicate to the transmitter station a first modulation level and a common code rate, the first modulation level for use by the transmitter station to transmit a first stream of signals to the receiver station, and the common code rate for use by the transmitter station to transmit the first and k−1 additional streams of signals to the receiver station, where k is an integer greater than 1;
transmitting by the receiver station, to the transmitter station, k−1 additional CQI to indicate to the transmitter station k−1 modulation levels for use by the transmitter station to transmit the k−1 additional streams of signals to the receiver station respectively; and
directly or indirectly informing the transmitter station an order of a plurality of spatial channels with respect to qualities of the plurality of spatial channels relative to each other;
wherein a second CQI of the k−1 additional CQI has a data size of 1 bit to indicate to the transmitter station whether to use a same or a lower modulation level as the first modulation level or a modulation level indicated by a third CQI of the k−1 additional CQI;
wherein the second CQI is associated with a corresponding quality ordered spatial channel that immediately succeeds another quality ordered spatial channel associated with the first CQI or the third CQI.

2. The method of claim 1, wherein the receiver station performs said transmissions at a first increment of time, and repeating said transmissions at a second increment of time later than the first increment of time.

3. The method of claim 1, further comprising the receiver station agreeing with the transmitter station to employ a single codeword mode to transmit the k streams of signals to the receiver station.

4. The method of claim 1 wherein one or more of the k−1 additional CQI has a data size of two bits to indicate a selection of one of three or four candidate modulation levels for the transmitter station.

5. The method of claim 1, wherein the receiver station indirectly informs the transmitter station the order of the plurality of spatial channels with respect to the qualities of the plurality of spatial channels relative to each other by transmitting a plurality of beamforming vectors associated with the spatial channels to the transmitter station.

6. The method of claim 1, wherein the lower modulation level is a selected one of one or two modulation levels lower than the modulation level indicated by the first CQI or the third CQI.

7. The method of claim 1, wherein the first CQI or the third CQI has a data size of 1 bit to indicate the modulation level to be used by the transmitter station.

8. The method of claim 1, wherein the transmitter station is a base station of a wireless network, and the receiver station is a subscriber station of the wireless network.

9. An article of manufacture, comprising:
a non-transitory storage medium; and
a plurality of programming instructions configured to program an apparatus to enable the apparatus to transmit a first channel quality indicator (CQI) to a transmitter station, the first CQI indicating a single common code rate and k modulation levels, the common code rate for use by the transmitter station for transmitting k streams of signals to the apparatus and each of the k modulation levels for use by the transmitter station for transmitting a corresponding one of the k streams of signals to the apparatus, where k is an integer greater than 1;

wherein at least one of the k modulation levels indicated by the first CQI has a data size of 1 bit to indicate to the transmitter station whether to use a same or a lower modulation level as a modulation level indicated by a second CQI; and wherein the at least one of the k modulation levels indicated by the first CQI is associated with a corresponding quality ordered spatial channel that immediately succeeds another quality ordered spatial channel associated with the second CQI.

10. The article of claim 9, wherein said instructions are adapted to enable the apparatus to transmit a third CQI to the transmitter station that includes two bits per modulation level for one or more of the k modulation levels indicated by the first CQI, where the two bits indicate a selection of one of three or four candidate modulation levels for use in transmitting a selected one of the k streams of signals.

11. The article of claim 9, wherein said instructions are adapted to enable the apparatus to directly or indirectly inform the transmitter station an order of a plurality of spatial channels with respect to qualities of the plurality of spatial channels relative to each other;

wherein each of the k modulation levels is associated with a corresponding spatial channel of the plurality of spatial channels.

12. The article of claim 11, wherein said instructions are adapted to enable the apparatus to indirectly inform the transmitter station the order of the plurality of spatial channels with respect to the qualities of the plurality of spatial channels relative to each other by transmitting a plurality of beamforming vectors associated with the spatial channels to the transmitter station.

13. An apparatus, comprising:
a transceiver to transmit and receive signals to and from a transmitter station; and
a controller coupled to the transceiver to control the transceiver to transmit to the transmitter station a first channel quality indicator (CQI) to indicate to the transmitter station at least a common code rate for use to transmit a first and k-1 additional streams of signals to the transceiver, where k is an integer greater than 1, and to control the transceiver to transmit to the transmitter station k-1 additional CQI to indicate to the transmitter station k-1 modulation levels for use by the transmitter station to transmit k-1 streams of signals to the apparatus respectively;

wherein the controller is adapted to control the transceiver to transmit signals to the transmitter station to directly or indirectly inform the transmitter station an order of a plurality of spatial channels with respect to qualities of the plurality of spatial channels relative to each other;

wherein a second CQI of the k-1 additional CQI has a data size of 1 bit to indicate to the transmitter station whether to use a same or a lower modulation level as the first modulation level or a modulation level indicated by a third CQI of the k-1 additional CQI; and wherein the second CQI is associated with a corresponding quality ordered spatial channel that immediately succeeds another quality ordered spatial channel associated with the first CQI or the third CQI.

14. The apparatus of claim 13, wherein the controller controls the transceiver to perform the transmissions at a first increment of time, and repeat the transmissions at a second increment of time later than the first increment of time.

15. The apparatus of claim 13, wherein one or more of the k-1 additional CQI has a data size of two bits for indicating a modulation level, and the controller is adapted to select for each of the two bits, one of three or four candidate modulation levels for use by the transmitter station.

16. The apparatus of claim 13, wherein the controller is further adapted to control the transceiver to transmit signals to the transmitter station to indirectly inform the transmitter station the order of the plurality of spatial channels with respect to the qualities of the plurality of spatial channels relative to each other by transmitting a plurality of beamforming vectors associated with the spatial channels to the transmitter station.

17. The apparatus of claim 13, wherein the lower modulation level is a selected one of one or two modulation levels lower than the modulation level indicated by the first CQI or the third CQI.

18. The apparatus of claim 13, wherein the third CQI and the first CQI has a data size of 1 bit to indicate to the transmitter station to use a modulation level.

19. A system, comprising:
a plurality of omnidirectional antennas;
a controller; and
a transmitter coupled to the controller and the antennas to transmit a first channel quality indicator (CQI) to a transmitter station, the first CQI indicating a single common code rate and k modulation levels, the common code rate for use by the transmitter station for transmitting k streams of signals to the system and each of the k modulation levels for use by the transmitter station for transmitting a corresponding one of the k streams of signals to the system, where k is an integer greater than 1;

wherein at least one of the k modulation levels indicated by the first CQI has a data size of 1 bit to indicate to the transmitter station whether to use a same or a lower modulation level as a modulation level indicated by a second CQI; and wherein the at least one of the k modulation levels indicated by the first CQI is associated with a corresponding quality ordered spatial channel that immediately succeeds another quality ordered spatial channel associated with the second CQI.

20. The system of claim 19, wherein the controller is an adaptive bit loading controller.

21. The system of claim 19, wherein the transmitter comprises a common forward error correction (FEC) encoder coupled to a common puncturer to achieve a target code rate and a common interleaver.

* * * * *